E. B. RHODES.
CLEANING DEVICE FOR WIND SHIELDS.
APPLICATION FILED FEB. 9, 1912.
1,028,843.
Patented June 4, 1912.
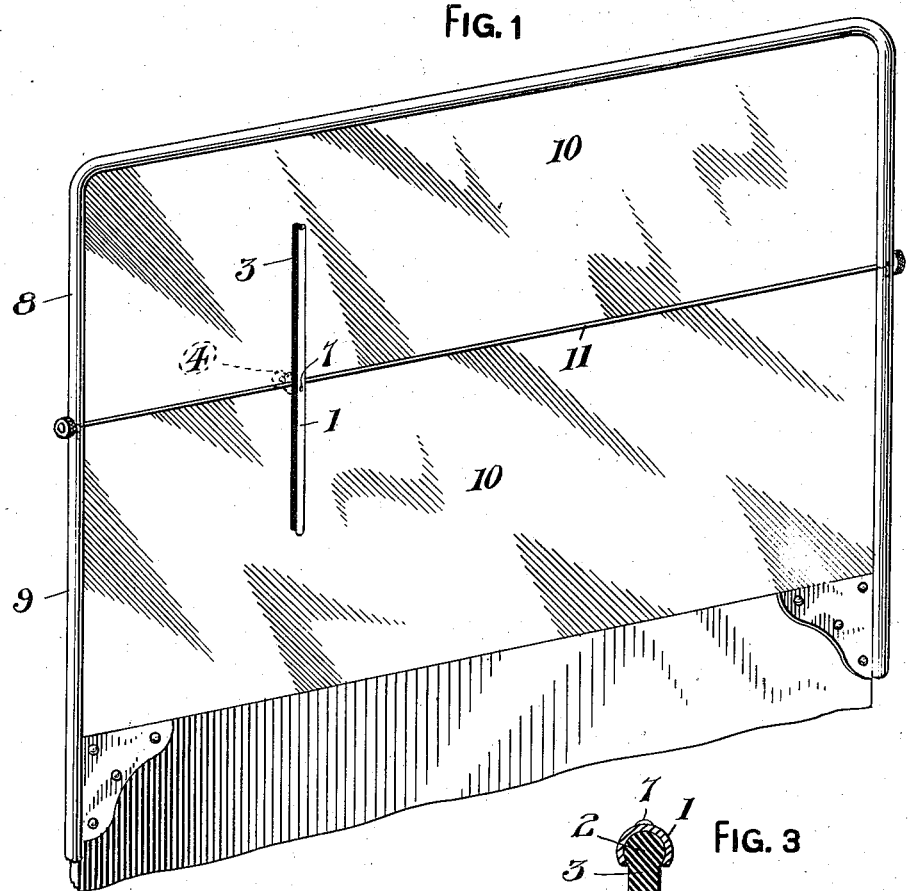

UNITED STATES PATENT OFFICE.

EWING B. RHODES, OF PITTSBURGH, PENNSYLVANIA.

CLEANING DEVICE FOR WIND-SHIELDS.

1,028,843.  Specification of Letters Patent.   Patented June 4, 1912.

Application filed February 9, 1912. Serial No. 676,662.

*To all whom it may concern:*

Be it known that I, EWING B. RHODES, a citizen of the United States of America, residing at Pittsburgh, in the county of Allegheny and State of Pennsylvania, have invented certain new and useful Improvements in Cleaning Devices for Wind-Shields, of which the following is a specification, reference being had therein to the accompanying drawing.

This invention relates to a cleaning device for the wind shields of automobiles and other vehicles, and the primary object of my invention is to provide positive and reliable means, in a manner as will be hereinafter set forth, for removing sleet, rain, snow and other matter from a portion of a wind shield, whereby the chauffeur of an automobile can readily see through the same and observe the path in which the automobile is traveling, thereby preventing pedestrians from being run down and injured due to the fact that the chauffeur cannot observe persons or objects in front of the machine.

Another object of this invention is to provide a simple and inexpensive device that can be easily and quickly manipulated for removing foreign matter from the front side of a wind shield, the device being applicable to various types of shields.

A further object of this invention is to accomplish the above results by a cleaning device that can be quickly installed and manipulated to provide a sight opening upon a snow coated wind shield, the device being arranged in a manner that prevents accidental displacement of the same when the automobile is in operation.

The principles of my invention are illustrated in the accompanying drawing, wherein:—

Figure 1 is a perspective view of a wind shield provided with the cleaning device, Fig. 2 is a vertical sectional view of the wind shield and a portion of the device as applied thereto, Fig. 3 is a horizontal sectional view of a portion of the wind shield and a portion of the device, showing the same stationary, and Fig. 4 is a similar view illustrating the device as though manually moved relatively to the wind shield.

Further describing my invention in detail, reference will be had to the drawing wherein like numerals denote corresponding parts throughout.

1 denotes a holder made of metal or other durable material, the holder being substantially semi-cylindrical or U-shaped and mounted in said holder is the longitudinal head or bead 2 of a cleaning strip 3. The cleaning strip 3 can be made of rubber, felt or other yieldable material, and said strip corresponds in length to the holder.

4 denotes a knob or handle having a head 5 provided with a stem 6 that is rectangular in cross section. The stem 6 extends through the yieldable strip 3 and is riveted or otherwise secured, as at 7 to the holder 1, intermediate the ends thereof.

8 and 9 denote the sections of a wind shield having transparent plates 10, said plates being spaced apart to provide a slot 11 at the hinged edges of the sections 8 and 9. It is in the slot 11 that the stem 6 is slidably mounted, said stem being placed therein when the sections 8 and 9 of the wind shield are assembled. The stem prevents the cleaning strip 3 from swinging out of the vertical position to which it is held by the stem 6, and with the head 5 in engagement with the rear side of the wind shield, the cleaning device will be frictionally held in engagement with the front side of the wind shield. Such frictional engagement or contact is shown in Fig. 3, and by gripping the knob or handle 4, the cleaning device can be moved from one end of the slot 11 to the opposite end thereof. A back and forth movement of the cleaning device causes the strip 3 to be compressed and frictionally engage the wind shield, as best shown in Fig. 4, thereby removing foreign matter from the front side of the shield as the cleaning device is shifted. The device is of sufficient length to provide a sight opening that permits of the chauffeur of the automobile observing the path of the machine.

While in the drawing there is illustrated a preferred embodiment of the invention, it is to be understood that the structural elements thereof are susceptible of such changes as fall within the scope of the appended claims.

What I claim is:—

1. A cleaner for a sectional wind shield, comprising a yieldable strip of cleaning material arranged at the adjoining edges of the sections of the wind shield and engaging the front side of the shield, and means extending between the adjoining edges of the sections of the wind shield to facilitate shifting said cleaning strip upon the front side of said shield.

2. A cleaner for a sectional wind shield, comprising a holder, a yieldable cleaning strip mounted in said holder, and capable of engaging one face of said shield for cleaning it, and a stem connected to said holder and extending between the sections of said wind shield for maintaining said strip in engagement with the front side of the shield and serving as operating means for moving the cleaning strip to and fro.

3. A cleaner for a sectional wind shield, comprising a holder, a yieldable cleaning strip mounted in said holder and capable of engaging one face of said shield for cleaning it, a stem connected to said holder and capable of extending between the sections of said wind shield for maintaining said strip in engagement with the front side of the shield, and means carried by said stem to facilitate shifting said cleaning device.

4. A cleaner device for a sectional wind shield, comprising a cleaning strip arranged in a vertical position at and capable of cleaning the front side of said shield, and a stem capable of extending between the sections of the shield and engaging the edges thereof for maintaining said strip in a vertical position and in frictional contact with the front side of said shield, a handle connected to said stem for facilitating the shifting of said strip.

In testimony whereof I affix my signature in the presence of two witnesses.

EWING B. RHODES.

Witnesses:
MAX H. SROLOVITZ,
CHRISTINA F. HOOD.